US012002643B2

(12) United States Patent
Thenkarai Narayanan et al.

(10) Patent No.: US 12,002,643 B2
(45) Date of Patent: Jun. 4, 2024

(54) CERAMIC PRINTED FUSE FABRICATION

(71) Applicant: EATON INTELLIGENT POWER LIMITED, Dublin (IE)

(72) Inventors: Venkat raman Thenkarai Narayanan, Prague (CZ); Miroslav Horky, Prague (CZ); Robert Stephen Douglass, Wildwood, MO (US); John Trublowski, Troy, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/538,438

(22) Filed: Nov. 30, 2021

(65) Prior Publication Data

US 2023/0170174 A1 Jun. 1, 2023

(51) Int. Cl.

| | |
|---|---|
| ***H01H 85/046*** | (2006.01) |
| ***H01H 69/02*** | (2006.01) |
| ***H01H 85/042*** | (2006.01) |
| ***H01H 85/38*** | (2006.01) |

(52) U.S. Cl.
CPC ........ *H01H 85/046* (2013.01); *H01H 69/022* (2013.01); *H01H 85/042* (2013.01); *H01H 85/38* (2013.01)

(58) Field of Classification Search
CPC .. H01H 69/022; H01H 85/042; H01H 85/046; H01H 85/08; H01H 85/10; H01H 85/38
See application file for complete search history.

(56) References Cited

U.S. PATENT DOCUMENTS 2,098,664 A * 11/1937 Jung ...................... H01H 85/10 337/252
3,148,257 A * 9/1964 Feenan ................ H01H 85/055 337/296
3,288,968 A * 11/1966 Feenan .................. H01H 69/02 337/295
3,413,586 A * 11/1968 Salzer .................... H01H 85/10 337/228
3,524,157 A * 8/1970 Salzer .................... H01H 85/10 337/159
3,543,210 A * 11/1970 Kozacka ................ H01H 85/10 337/159

(Continued)

FOREIGN PATENT DOCUMENTS

JP 2002042632 A 2/2002
WO WO 2006032060 A2 3/2006

OTHER PUBLICATIONS

Gokce et al., "Characterization of microstructural and thermal properties of steatite/cordierite ceramics prepared by using natural raw materials", Journal of the European Ceramic Society 31 (2011) 2741-2747, available online Dec. 31, 2010.

(Continued)

*Primary Examiner* — Jacob R Crum
(74) *Attorney, Agent, or Firm* — Baker Botts L.L.P.

(57) ABSTRACT

A printed fuse fabrication is provided. The printed fuse includes a low thermal conductivity ceramic substrate and a fusible element printed on the substrate. The fusible element printed on the substrate includes a series of portions of reduced printed thickness, defining weak spots for fusible operation of the fusible element, respectively separated by portions of increased printed thickness.

20 Claims, 8 Drawing Sheets

(56) References Cited

U.S. PATENT DOCUMENTS

| | | | | | |
|---|---|---|---|---|---|
| 5,357,234 | A * | 10/1994 | Pimpis | H01H 85/165 337/252 |
| 5,479,147 | A * | 12/1995 | Montgomery | H01H 85/046 337/273 |
| 6,194,989 | B1 * | 2/2001 | Douglass | H01H 85/10 337/260 |
| 6,384,708 | B1 * | 5/2002 | Jollenbeck | H01H 85/0411 439/890 |
| 9,911,566 | B2 | 3/2018 | Retardo et al. | |
| 11,087,943 | B2 | 8/2021 | Douglass et al. | |
| 2003/0142453 | A1 * | 7/2003 | Parker | H01H 85/046 361/104 |
| 2008/0191832 | A1 * | 8/2008 | Tsai | H01H 85/0411 29/623 |
| 2009/0167480 | A1 | 7/2009 | Wiryana | |
| 2020/0274375 | A1 | 8/2020 | Griffiths | |
| 2021/0074501 | A1 | 3/2021 | Douglass | |
| 2021/0183606 | A1 | 6/2021 | Douglass et al. | |

OTHER PUBLICATIONS

Kyocera, "Characteristics of Kyocera Fine Ceramics", 2021, retrieved from https://global.kyocera.com/prdct/fc/product/pdf/material.pdf.

International Search Report and Written Opinion for International Application No. PCT/EP2022/025535, 12 pages, dated Feb. 24, 2023.

* cited by examiner

CERAMIC PRINTED FUSE FABRICATION

BACKGROUND OF THE DISCLOSURE

The field of the disclosure relates generally to electrical circuit protection fuses, and more specifically to printed fuse fabrications on ceramic substrates for high voltage, direct current (DC) power systems of an electric vehicle (EV).

Fuses are widely used as overcurrent and short circuit protection devices to prevent costly damage to electrical circuits. Fuse terminals typically form an electrical connection between an electrical power source or power supply and an electrical component or a combination of components arranged in an electrical circuit. One or more fusible links or elements, or a fuse element assembly, is connected between the fuse terminals, so that when electrical current flowing through the fuse exceeds a predetermined limit, the fusible elements melt and open one or more circuits through the fuse to prevent electrical component damage.

High voltage, direct current power systems pose particular challenges for fuse manufacturers in markets where smaller and lighter fuse packages are increasingly demanded. Realizing desired fuse opening times and managing increasingly severe arc energy in high voltage, high current applications in a reduced amount of physical space is difficult to accomplish. Certain types of DC power systems that involve relatively extreme cyclic current loads impose still further challenges that tend to result in premature failure of the fuse. In the context of an EV power system, premature fuse failure is inherently problematic, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
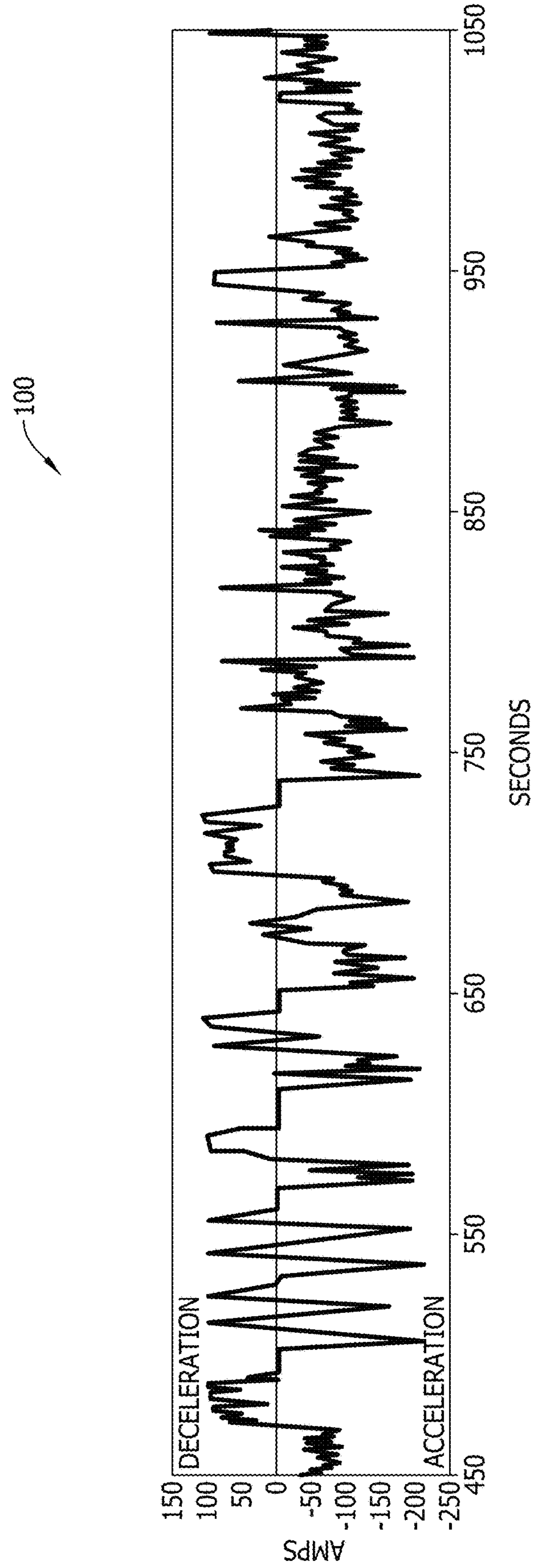
FIG. 1 illustrates an exemplary transient current pulse profile generated in an electrical power system.

Recent advancements in electric vehicle technologies present unique challenges to fuse manufacturers. Electric vehicle manufacturers are seeking fusible circuit protection for electrical power distribution systems operating at voltages much higher than conventional electrical power distribution systems for vehicles, while simultaneously seeking smaller fuses to meet electric vehicle specifications and demands.

Electrical power systems for conventional, internal combustion engine-powered vehicles operate at relatively low voltages, typically at or below about 48 VDC. Electrical power systems for electric-powered vehicles, referred to herein as electric vehicles (EVs), however, operate at much higher voltages. The relatively high voltage systems (e.g., 200 VDC and above) of EVs generally enables the batteries to store more energy from a power source and provide more energy to an electric motor of the vehicle with lower losses (e.g., heat loss) than conventional batteries storing energy at 12 Volts (V) or 24 V used with internal combustion engines, and more recent 48 V power systems.

EV original equipment manufacturers (OEMs) employ circuit protection fuses to protect electrical loads in all-battery electric vehicles (BEVs), hybrid electric vehicles (HEVs), and plug-in hybrid electric vehicles (PHEVs). Across each EV type, EV manufacturers seek to maximize the mileage range of the EV per battery charge while reducing cost of ownership. Accomplishing these objectives turns on the energy storage and power delivery of the EV system, as well as the size, volume, and mass of the vehicle components that are carried by the power system. Smaller and/or lighter vehicles will more effectively meet these demands than larger and heavier vehicles. As such, all EV components are now being scrutinized for potential size, weight, and cost savings.

Generally speaking, larger components tend to have higher associated material costs, tend to increase the overall size of the EV or occupy an undue amount of space in a shrinking vehicle volume, and tend to introduce greater mass that directly reduces the vehicle mileage per single battery charge. Known high voltage circuit protection fuses are, however, relatively large and relatively heavy components. Historically, and for good reason, circuit protection fuses have tended to increase in size to meet the demands of high voltage power systems as opposed to lower voltage systems. As such, existing fuses needed to protect high voltage EV power systems are much larger than the existing fuses needed to protect the lower voltage power systems of conventional, internal combustion engine-powered vehicles. Smaller and lighter high voltage power fuses are desired to meet the needs of EV manufacturers, without sacrificing circuit protection performance.

Electrical power systems for state of the art EVs may operate at voltages as high as 450 VDC or even higher. The increased power system voltage desirably delivers more power to the EV per battery charge. Operating conditions of electrical fuses in such high voltage power systems is much more severe, however, than lower voltage systems. Specifically, specifications relating to electrical arcing conditions when the fuse opens can be particularly difficult to meet for higher voltage power systems, especially when coupled with the industry preference for reduction in the size of electrical fuses. Current cycling loads imposed on power fuses by state of the art EVs also tend to impose mechanical strain and wear that can lead to premature failure of a conventional fuse element. While known power fuses are presently available for use by EV OEMs in high voltage circuitry of state of the art EV applications, the size and weight, not to mention the cost, of conventional power fuses capable of meeting the requirements of high voltage power systems for EVs is impractically high for implementation in new EVs.

Providing relatively smaller power fuses that can capably handle high current and high battery voltages of state of the art EV power systems, while still providing acceptable interruption performance as the fuse element operates at high voltages, is challenging, to say the least. Efforts have been recently made to improve fuses and fuse elements with higher current capability in smaller package sizes for use in EV power systems that can capably handle increased amounts of arc energy in the operation of the fuse and deliver desired circuit protection performance. Such improved fuses include stamped and formed fuse elements connected in parallel with particular application of arc barrier materials and silicated filler materials. The stamping processes to form the fuse elements, however, renders the fuse elements vulnerable to premature mechanical failure when subjected to extreme thermal cycling in an EV power system. This is sometimes referred to in the art as fuse fatigue.

Printed fuse fabrications on ceramic material substrates are of emerging interest to meet the particular needs of state of the art DC power systems in electric vehicles. Printing fuse elements on ceramic substrates can advantageously avoid thermal-mechanical fatigue in the load cycling of an EV power system and associated nuisance operation of the fuse that has been found to undesirably occur in fuse elements that are alternatively formed via stamping or punching processes in freestanding metal fuse elements. Combinations of printed fuse elements and freestanding conductor materials have been proposed with some success for EV power system applications. See, e.g., U.S. Pat. No. 11,087,943. While these can reliably perform in EV power systems in a manner that is immune to thermal-mechanical cycling induced fuse fatigue, smaller and less complicated fuse elements are desired, without compromising circuit protection performance. Improvements are accordingly needed to meet longstanding and unfulfilled needs in the art.

In order to understand the invention to its fullest extent, set forth below is a discussion of the state of the art for power fuses and issues presented in EV power system applications, followed by exemplary embodiments of the present invention that overcome the deficiencies of existing fuse solutions. While described in the context of EV applications and a particular type and ratings of fuses, the benefits of the disclosure are not necessarily limited to EV applications or to the particular ratings described. Rather the benefits of the disclosure are believed to more broadly accrue to many different power system applications and can also be practiced in part or in whole to construct different types of fuses having similar or different ratings than those discussed herein. Method aspects will be in part apparent and in part explicit in the following discussion.

FIG. 1 illustrates an exemplary current drive profile 100 in an EV power system application that can render a conventional power fuse, and specifically the fuse element or fuse elements therein including stamped weak spots, susceptible to load current cycling fatigue. The current is shown along a vertical axis in FIG. 1 with time shown along the horizontal axis. In typical EV power system applications, power fuses are used as circuit protection devices to prevent damage to electrical loads from electrical fault conditions. The power system may be operated at voltages above 500 V and/or at currents above 150 Amperes (A). Considering the example of FIG. 1, EV power systems experience large seemingly random variance in current loads over relatively short periods of time, for example, between −250 A and 150 A. The seemingly random variance in current produces current pulses of various magnitudes in sequences caused by seemingly random driving habits based on the actions of the driver of the EV vehicle, traffic conditions, and/or road conditions. This creates a practically infinite variety of current loading cycles on the EV drive motor, the primary drive battery, and any protective power fuse included in the system.

Such random current loading conditions, exemplified in the current pulse profile of FIG. 1, are cyclic in nature for both the acceleration of the EV (corresponding to battery drain) and the deceleration of the EV (corresponding to regenerative battery charging). This current cyclic loading imposes thermal cycling stress on the fuse element, and more specifically in the weak spots of the fuse element assembly in the power fuse, by way of a joule effect heating process. This thermal cyclic loading of the fuse element imposes mechanical expansion and contraction cycles on the fuse element weak spots in particular. This repeated mechanical cyclic loading of the fuse element weak spots imposes an accumulating strain that damages the weak spots to the point of breakage over time. For the purposes of the present description, this thermal-mechanical process and phenomena is referred to herein as fuse fatigue. As explained further below, fuse fatigue is attributable mainly to creep strain as the fuse endures the drive profile. Heat generated in the fuse element weak spots is the primary mechanism leading to the onset of fuse fatigue.

Figure 2A:
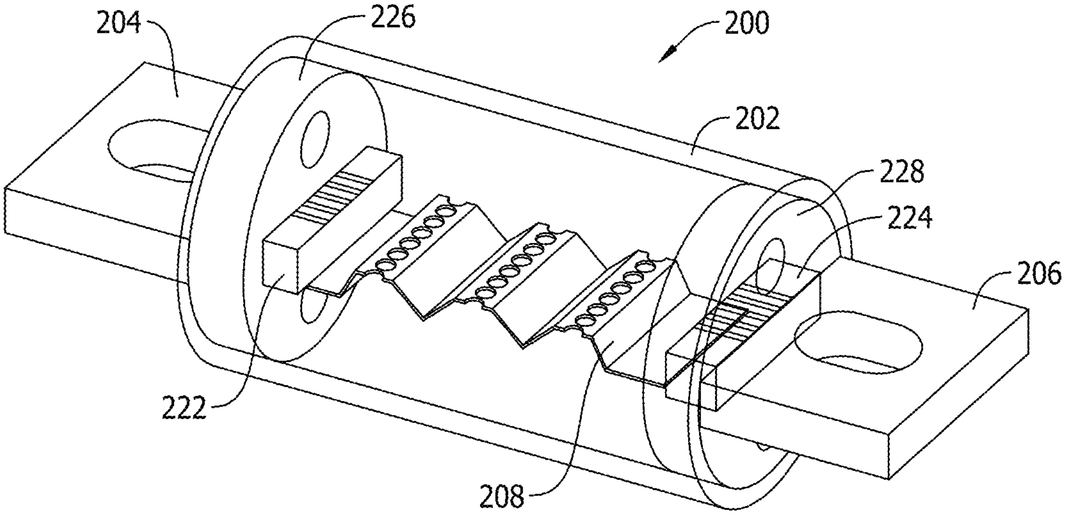
FIG. 2A (PRIOR ART)
FIG. 2A is a perspective view of a known power fuse.

FIG. 2A shows an exemplary high voltage power fuse 200 that is proposed for use with an EV power system. The power fuse 200 includes a housing 202, terminal blades 204, 206 configured to connect to line and load side circuitries, and a fuse element assembly 208 that completes an electrical connection between the terminal blades 204, 206 through terminal contact blocks 222, 224 provided on end plates 226, 228. When subjected to predetermined current conditions, at least a portion of the fuse element assembly 208 melts, disintegrates, or otherwise structurally fails and opens the circuit path between the terminal blades 204, 206. Load side circuitry is therefore electrically isolated from the line side circuitry to protect load side circuit components from damage when electrical fault conditions occur.

Figure 2B:
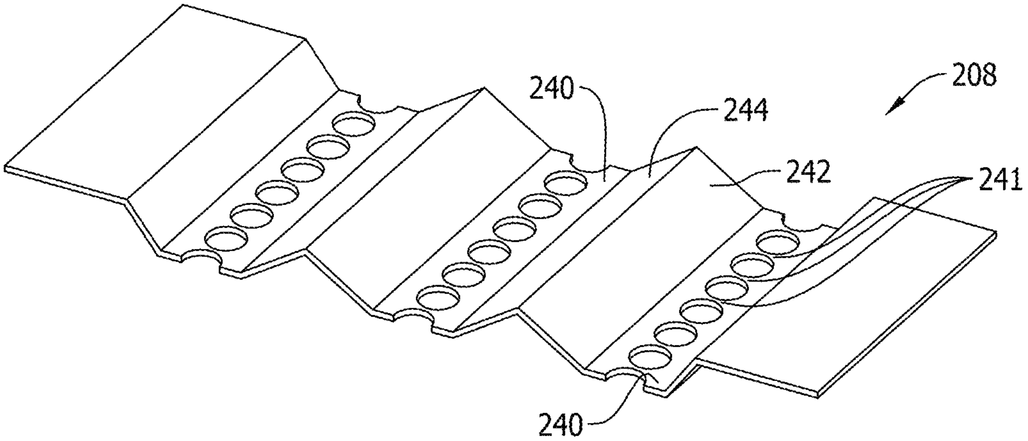
FIG. 2B (PRIOR ART)
FIG. 2B is a perspective view of the fuse element assembly of the power fuse shown in FIG. 2A.

FIG. 2B illustrates the fuse element assembly 208 of power fuse 200 in further detail. The fuse element assembly 208 is generally formed from a freestanding strip of electrically conductive material into a series of co-planar sections 240 connected by oblique sections 242, 244. The oblique sections 242, 244 are formed or bent out of plane from the planar sections 240.

In the example shown, the planar sections 240 define a plurality of sections of reduced cross-sectional area, referred to in the art as weak spots. The weak spots 241 are defined by apertures in the planar sections 240. The weak spots 241 correspond to the narrow portion of the planar section 240 between adjacent apertures. The reduced cross-sectional areas at the weak spots 241 will experience higher heat concentration than the rest of the fuse element assembly 208 as current flows through the fuse element assembly 208.

The weak spots 241 of the fuse element assembly 208 are typically fabricated by metal stamping or punching processes. Such stamped or punched fuse elements to form the weak spots 241 have been found to be disadvantageous, however, for EV applications having the type of cyclic current loads described above. Such stamped or punched fuse element designs undesirably introduce mechanical strains and stresses on the fuse element weak spots 241 such that a shorter service life tends to result. This short fuse service life manifests itself in the form of nuisance fuse operation resulting from thermal-mechanical fatigue cycling of the fuse element at the weak spots 241.

Figure 2C:
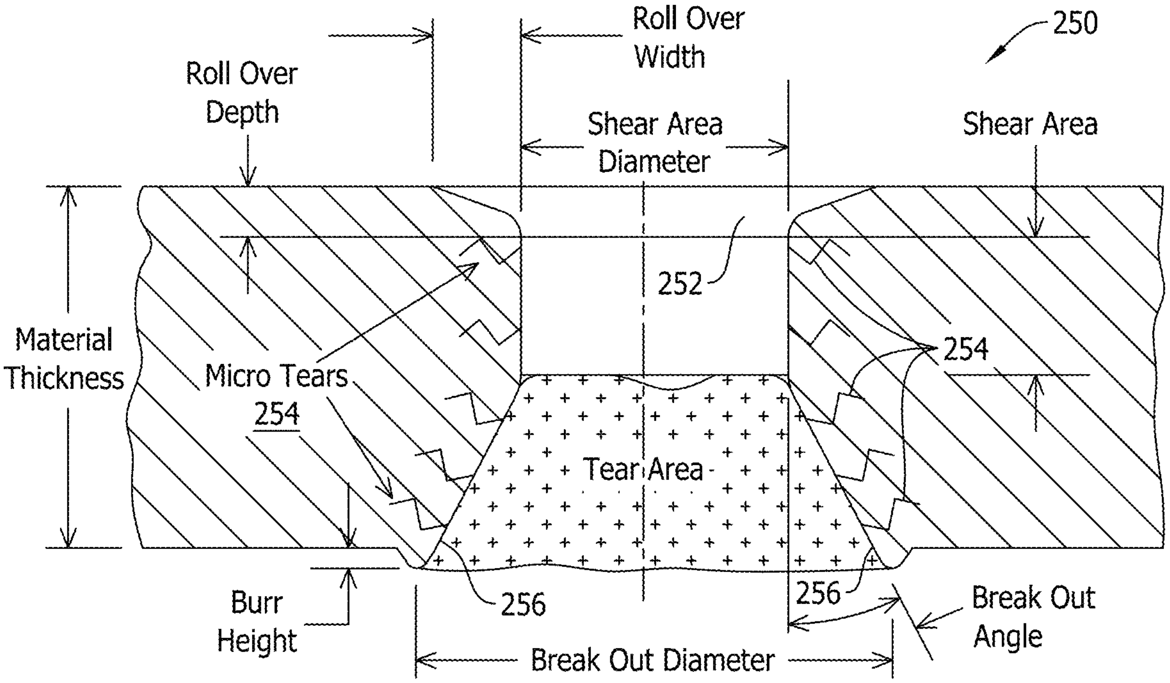
FIG. 2C (PRIOR ART)
FIG. 2C is a schematic diagram of a weak spot of the fuse element assembly shown in FIG. 2B.

FIG. 2C shows the cross-sectional view of a metal plate 250 after an aperture 252 is punched through the metal plate 250. After a punching or stamping process, micro tears 254 occur along the border 256 of the aperture 252.

Figure 2D:
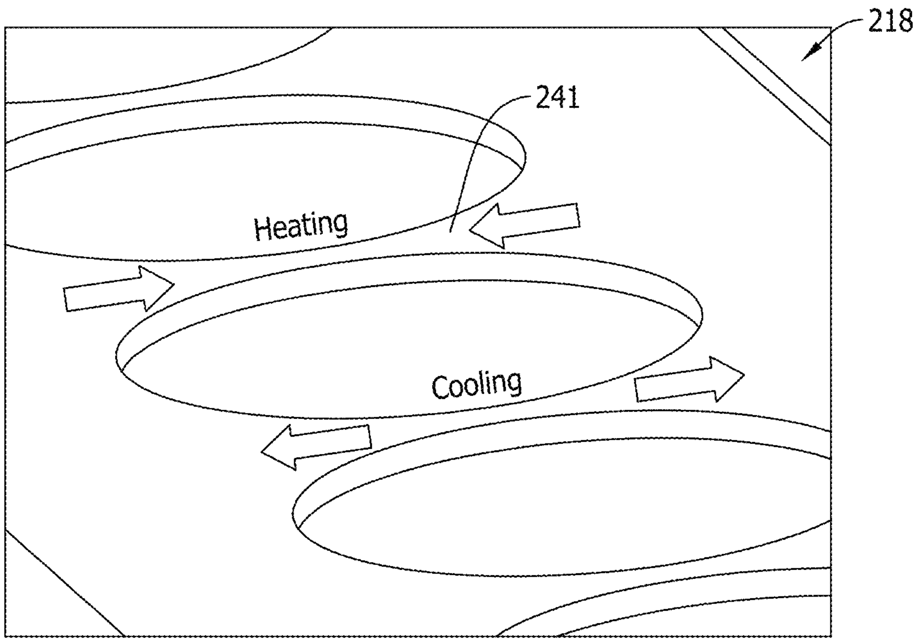
FIG. 2D (PRIOR ART)
FIG. 2D is a schematic diagram illustrating the weak spots of the fuse element assembly shown in FIG. 2B under load current cycling events.
Figure 2E:
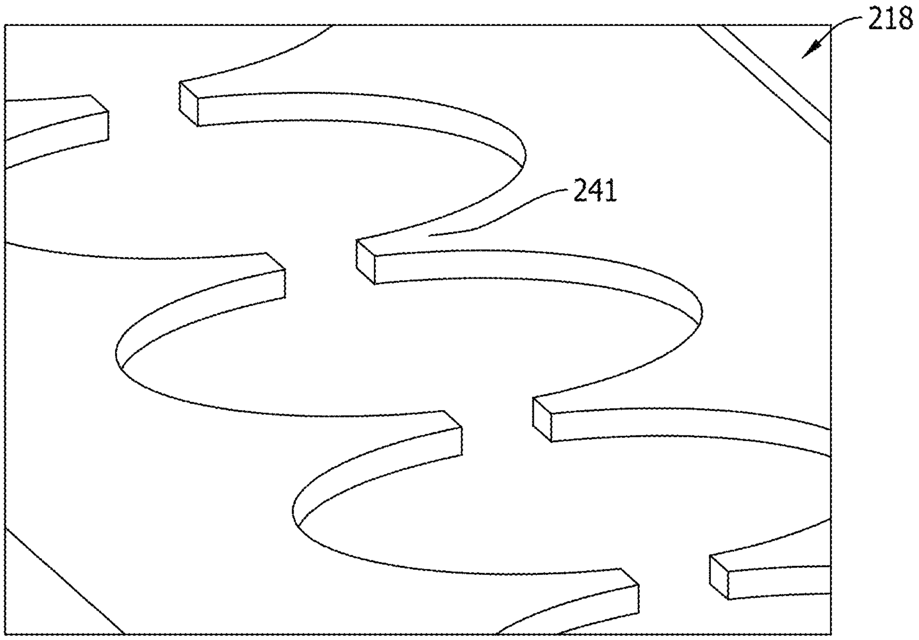
FIG. 2E (PRIOR ART)
FIG. 2E is a schematic diagram illustrating the weak spots of the fuse element assembly shown in FIG. 2B that fail after load current cycling events.

As shown in FIGS. 2D and 2E, the weak spots 241 of the fuse element assembly 208 experience repeated high current pulses and cyclic current events (FIG. 2D), which lead to metal fatigue from grain boundary disruptions followed by crack propagation and failure in the fuse element assembly 208 at the weak spots 241 (FIG. 2E). The mechanical constraints of the fuse element assembly 208 are inherent in the stamped fuse element design and manufacture, which unfortunately has been found to promote in-plane buckling of the weak spots 241 during repeated load current cycling. This in-plane buckling is the result of damage to the metal grain boundaries where a separation or slippage occurs between adjacent metal grains. Such buckling of weak spots 241 occurs over time and is accelerated and more pronounced with higher transient current pulses. The greater the heating-cooling delta in the transient current pulses, the greater the mechanical influence, and thus the greater the in-place buckling deformation of the weak spots 241.

Repeated physical mechanical manipulations of metal, caused by the heating effects of the transient current pulses, in turn cause changes in the grain structure of the metal fuse element. These mechanical manipulations are sometimes referred to as working the metal. Working of metals will cause a strengthening of the grain boundaries where adjacent grains are tightly constrained to neighboring grains. Over working of a metal will result in disruptions in the grain boundary, where grains slip past each other and cause what is called a slip band or plane. This slippage and separation between the grains results in a localized increase of the electrical resistance that accelerates the fatigue process by increasing the heating effect of the current pulses. The formation of slip bands is where fatigue cracks are first initiated.

As understood, manufacturing methods of stamping or punching metal to form the fuse element assembly 208 causes localized slip bands on all stamped edges of the fuse element weak spots 241 because the stamping processes to form the weak spots 241 are shearing and tearing mechanical processes. This tearing process pre-stresses the weak spots 241 with many slip band regions. The slip bands and fatigue cracks, combined with the buckling described due to heat effects, eventually lead to a premature structural failure of the weak spots 241 that are unrelated to electrical fault conditions. Such premature failure mode that does not relate to a problematic electrical condition in the power system is sometimes referred to as nuisance operation of the fuse. Since the circuitry connected to the fuse is not operational once the fuse elements fail until the fuse is replaced, avoiding such nuisance operation is highly desirable in an EV power system from the perspective of both EV manufacturers and consumers. Indeed, given an increased interest in EV vehicles and their power systems, the effects of fuse fatigue are deemed to be a negative Critical to Quality (CTQ) attribute in the vehicle design.

Figure 3:
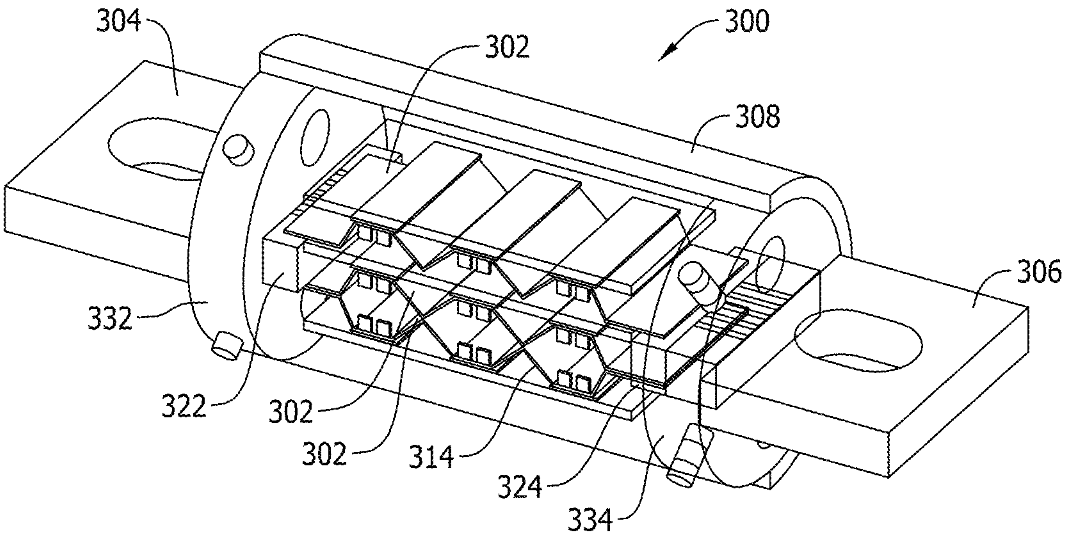
FIG. 3 is a partial perspective view of an exemplary power fuse.

FIG. 3 shows an alternative power fuse 300 including element assembly 302 in a housing 308 with terminal blades 304, 306 configured to connect the power fuse 300 to line and load side circuitry. The electrical connection of the fuse element assembly 302 is completed through terminal contact blocks 322, 324 provided on end plates 332, 334 and the terminal blades 304, 306. When subjected to predetermined current conditions, at least a portion of the fuse element assembly 302 melts, disintegrates, or otherwise structurally fails and opens the circuit path between the terminal blades 304, 306. Load side circuitry is therefore electrically isolated from the line side circuitry to protect load side circuit components from damage when electrical fault conditions occur.

To address the fuse fatigue problem each fuse element assembly 302 includes a substrate 310, a plurality of weak spots 312 printed on the substrate, and a separately provided freestanding conductor 314 assembled to and interconnecting the substrates 310. The reader is referred to U.S. Pat. No. 11,087,943 that is incorporated by reference herein for further details. Beneficially, the fuse element assembly 302 does not include stamped or punched weak spots (or any associated tearing or shearing of material processes) anywhere in the construction, and the power fuse 200 is therefore not affected by fuse fatigue issues associated with stamped or punched weak spots. The power fuse 300 is therefore better suited for EV power system applications than the power fuse 200, but the manufacture of the fuse is relatively complicated. Simpler yet reliable fuse fabrications are desired.

The power fuse 300 is sometimes referred to as a hybrid approach via the combination of printed fuse elements defining weak spots on the substrate 310 and the metal conductors 314 that are not printed elements but likewise do not include punched or stamped features. The conductors 314 improve fuse clearing times and also assist in clearing arc energy in a high voltage, high current DC power system of an EV. Achieving desired fuse clearing times in a non-hybrid construction (i.e., one including only printed elements on the substrate) are desired.

The inventors have realized, however, that fuse opening times in a non-hybrid construction can be unacceptably high for an EV power system. For example, in an EV power system application a desired opening time for an 800% overcurrent is about 20 ms but experimentally observed values in existing non-hybrid fuse constructions capable of handling 400 A in a 500 VDC operating system are as high as 300 ms. Additionally, known non-hybrid printed fuse constructions are generally incapable of containing arc energy in the operation of the fuse in high voltage, high current DC power systems such as EV power systems.

Exemplary embodiments of non-hybrid printed fuse elements and methods of fabricating such fuse elements are described below that advantageously avoid the strain damages at weak spots from the manufacturing process of stamping or punching, while also providing desired opening times and an effective arc extinguishing mechanism for EV power system applications. Weak spots in the exemplary embodiments are formed directly onto a planar substrate via additive printing processes, avoiding micro tears in material from punching or stamping processes. The entire fuse element is formed on the substrate without needing any separately provided conductor elements of hybrid solutions described above. Manufacturing costs and assembly steps associated with separately provided conductor elements are therefore avoided.

Figure 4:
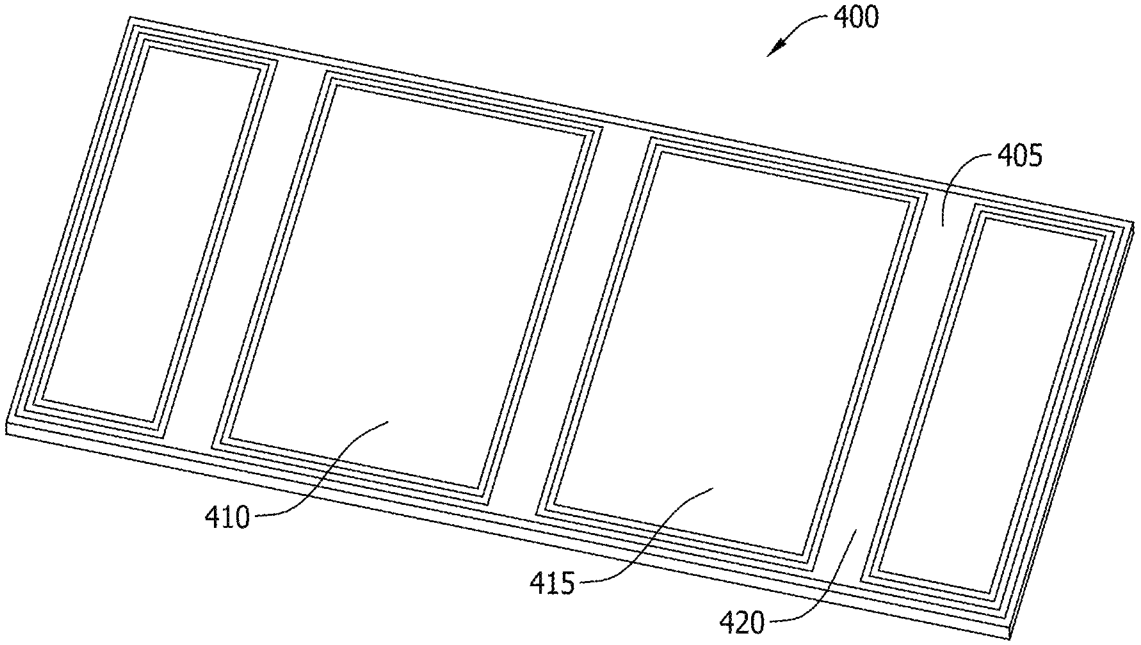
FIG. 4 is a cross-sectional magnified view of a portion of an exemplary fuse element assembly.
Figure 5:
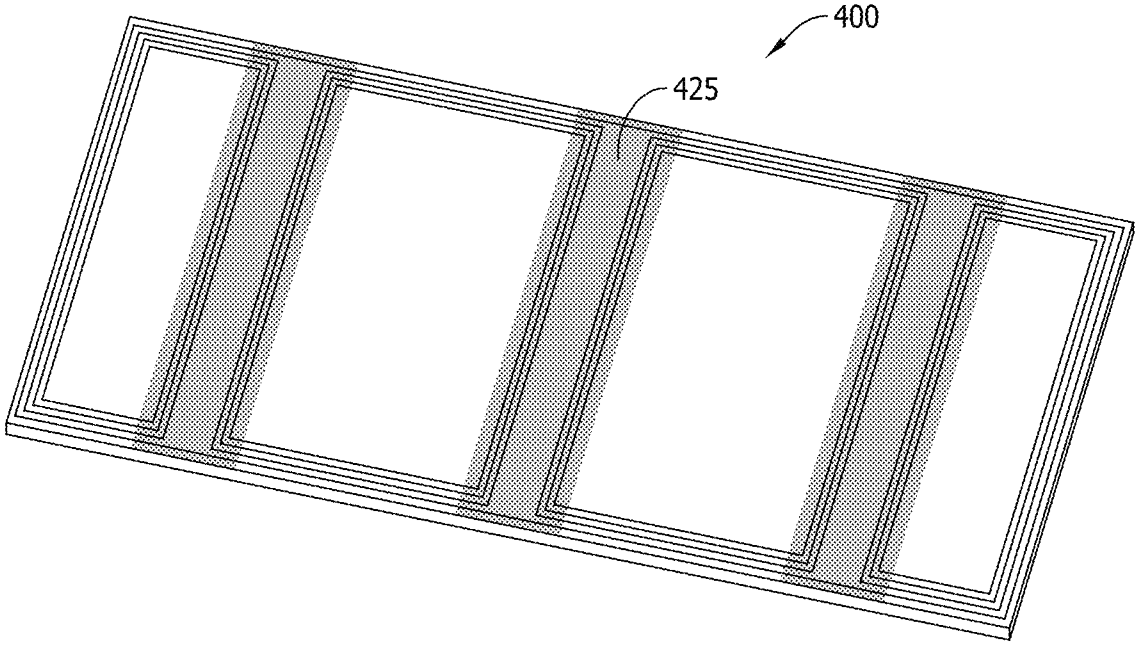
FIG. 5 is a schematic diagram of attaching the conductor with the weak spots.

FIGS. 4 and 5 illustrate an exemplary embodiment of a printed fabrication of fuse element assembly 400 that has been proposed to overcome the deficiencies of fuse elements in the power fuses 200 and 300 described above.

Figure 9:
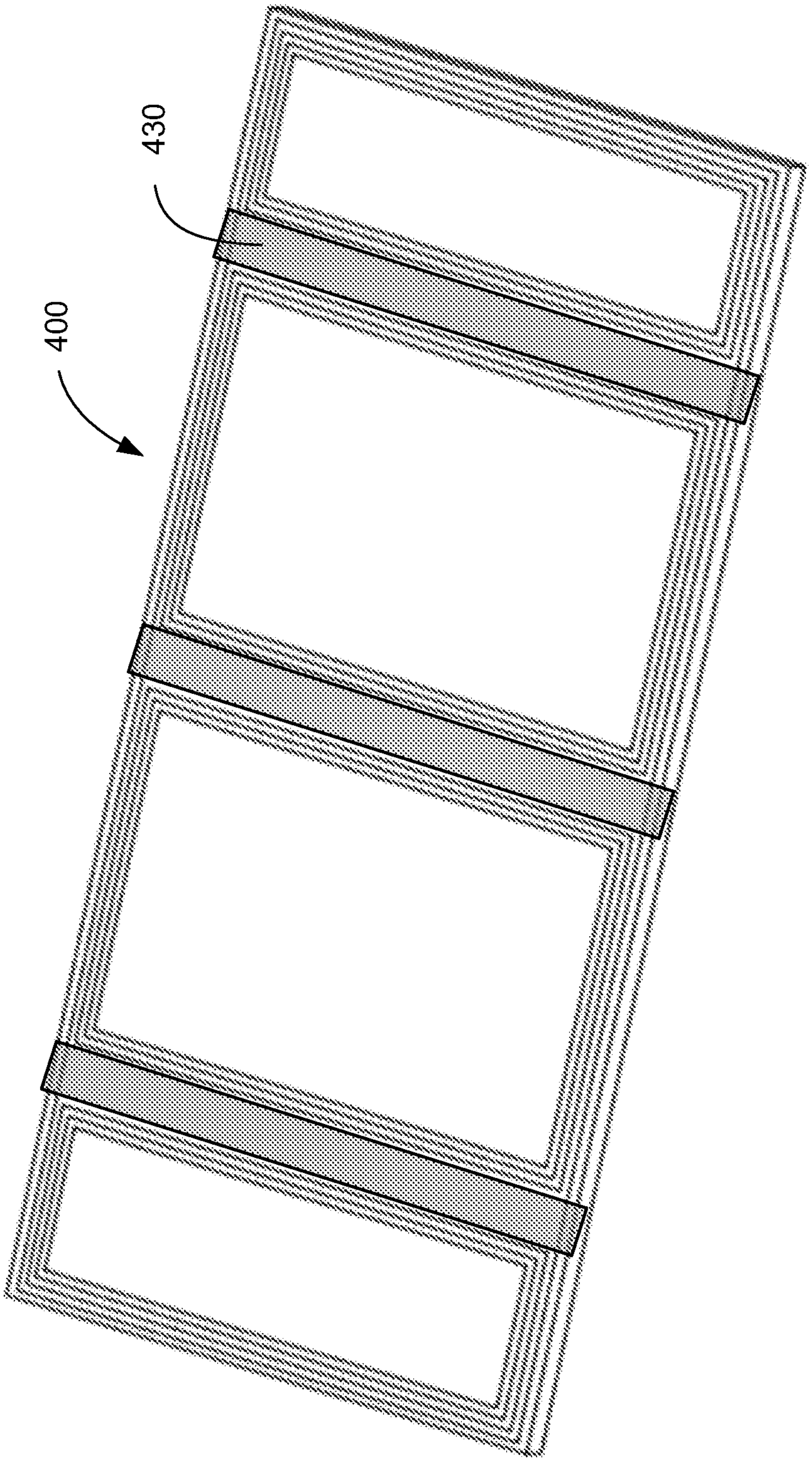
FIG. 9 is a schematic diagram of attaching the conductor with the weak spots.

The printed fuse fabrication in the example shown includes a substrate 405 and a series of successively printed metal layers 410 on the surface of the substrate. The successively printed layers provide patterned metallized portions on the substrate that are operable as fuse elements via the different thickness of metal material provided by the layers in the pattern utilized. The substrate 405 in contemplated embodiments is fabricated from a known ceramic material while the metal layers may be silver or another metal or metal alloy known in the art. The metal layers may be copper, copper alloy, aluminum, or aluminum alloy. The metal layers are printed to form thick sections 415 and thin sections 420 separated from one another. The thick sections 415 have higher numbers of layers than the thin sections 420, with the thin sections 420 operating as reduced cross-sectional area weak spots for fusible operation to open the circuit path on the substrate at various locations corresponding to the thin sections 420 in the illustrated example including three spaced apart thin sections 420 separated by thick sections 415 on the substrate 405. As shown in FIG. 5, dielectric layers 425 such as glass may be printed on the substrate beneath the thin sections 420 defining the weak spots. As shown in FIG. 9, dielectric layers 430 may be printed on the substrate beneath the thin sections 420 defining the weak spots. The metallized layers defining the thin sections 420 and thick sections 415 generally cover the entire surface of the substrate 405 in the example of FIGS. 4 and 5 and 9, and the thin sections 420 extend continuously between the thick sections 415. That is, the thin sections 420 cover the entire area between the thick sections 415 for the full width of the substrate as shown in FIGS. 4 and 5 and 9.

The inventors have discovered that the successful operation (or not) of the printed fuse element 400 in an EV power system depends on the substrate material and the thermal conductivity of the substrate 405 balanced with the desired opening time and arc containment considerations. This presents a complex set of issues that must be reconciled.

Varying the printed thickness of the weak spots in the fuse element 400 can adjust the opening time of the fuse. Generally speaking a thinner weak spot will open faster than a thicker weak spot, although printing processes can present a limited ability to achieve some desired opening times with the continuous weak spots shown in FIGS. 4 and 5.

The thermal conductivity of the substrate 405 will also affect the opening time of the fuse element 400 at the weak spots. Generally speaking a higher thermal conductivity of the substrate 405 will draw heat from the weak spots and increase opening time at the weak spots, while a lower thermal conductivity of the substrate 405 will more efficiently concentrate the heat in the weak spots themselves and reduce opening time at the weak spots.

The substrate material, and also its conductivity, will further affect the arcing conditions. Certain types of ceramic substrate materials (e.g., alumina-oxide) having higher thermal conductivity may break down when exposed to arcing energy (specifically heat produced by arcing) and emit elements that could undesirably prolong electrical arcing, whereas substrates of lower thermal conductivity (e.g., forsterite and steatite) may not break down as quickly and will not emit elements that contribute to electrical arcing and therefore may reduce arcing burnout time. As such, electrical arcing will burn out more quickly with a lower conductivity substrate than it may with a higher conductivity substrate.

The dielectric layers 425 shown in FIG. 5 may also affect heat transfer to the substrate 405 in the operation of the weak spots and may affect the breakdown point of the substrate 405 and therefore be a consideration from an arcing management perspective.

It is recognized that many substrate materials are available having a range of material properties. For example, alumina oxide ($Al_2O_3$) substrate materials are known to range from about 8 watts per meter-Kelvin (W/(m·K)) to about 32 W/(m·K). In contrast, forsterite substrate materials are known that have a thermal conductivity of about 5 W/(m·K), and steatite substrate materials are known to have a thermal conductivity of about 2 to about 3 W/(m·K). For the purposes of the present invention, a thermal conductivity in a range of about 2 to 14 W/(m·K) may be preferred for a higher voltage, higher current DC power system such as those described above. For comparison, however, experiment has shown that a substrate having a thermal conductivity of about 24 W/(m·K) tended to extend the opening time to unacceptable levels for an EV power system application.

Figure 6:
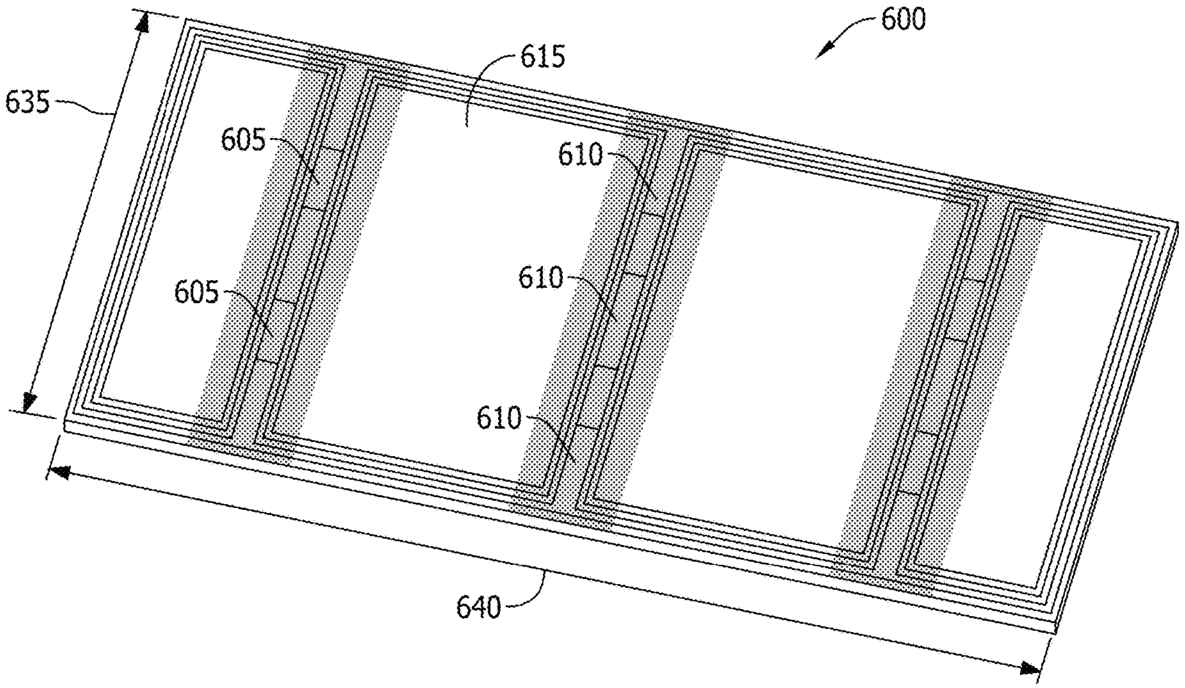
FIG. 6 is a schematic diagram of an exemplary embodiment of the fuse element assembly.

FIG. 6 illustrates another exemplary embodiment of a printed fuse element assembly 600 including further enhancements for EV power system operation. The fuse element assembly 600 includes the substrate 615 metalized with printed layers in patterned portions of increased printed thickness and reduced printed thickness. When the metallic layers are printed in increased and reduced printed thickness portions, the reduced printed thickness defines weak spots for fusible operation of the fusible element 605 printed on the substrate 615. In some embodiments, the substrate 615 has an increased printed thickness of up to about 1.2 mm and a reduced printed thickness defining weak spots of down to about 10 microns.

Unlike the continuous weak spots illustrated in FIGS. 4 and 5, the weak spots extend in discrete segments that cover only a portion of the substrate and/or dielectric layer beneath the weak spots and cover only a portion of the area between the thick portions. The defined weak spots extend in the example shown with a width dimension substantially less than the substrate width dimension 640 and with a length dimension equal to the substrate length dimension 635. In some embodiments, the defined weak spots extend with a width dimension of up to about 5 mm and with a length dimension of about 1 mm.

In the exemplary embodiment shown, the fuse element assembly 600 may be surrounded at least in part by an arc extinguishing filler 610. The arc extinguishing filler 610 may extend between the defined weak spots. The material for the arc extinguishing filler 610 is selected such that it has a relatively high heat conduction and absorption capacity. When the defined weak spots melt at predetermined current conditions, arcing starts and migrates from the defined weak spots and the substrate 615 into the surrounding arc extinguishing filler 610 for efficient cooling and quicker extinguishment.

In some embodiments, the fusible element 605 printed on the substrate 615 includes silver. The substrate 615 is a low thermal conductivity substrate. In some embodiments, the substrate 615 may have a thermal conductivity substantially less than 24 W/(m·K). In other embodiments, the substrate 615 may have a thermal conductivity of about 5 W/(m·K) or less.

In some embodiments, the substrate 615 may be Steatite or Forsterite as opposed to Alumina Oxide. As magnesium-based substrates, Steatite and Forsterite absorb more energy than Alumina, an aluminum-based substrate. Greater energy absorption is desired to prolong the life of the substrate 615 during high current pulses experienced by the fuse element assembly 600 to avoid metal fatigue. In addition to increased energy absorption, Steatite and Forsterite are silicates, as opposed to a metallic oxide like Alumina, providing Steatite and Forsterite with increased arc suppression capabilities to avoid metal fatigue of the fuse element assembly 600.

Furthermore, Steatite and Forsterite have decreased thermal conductivities, 3 W/m/K for Steatite and 5 W/m/K for Forsterite, as compared to Alumina Oxide. Decreased thermal conductivity is desired to increase the speed at which the substrate 615 melts and quenches an arc, decreasing the melting time of the fuse element assembly 600. Alternate substrate materials to Alumina are desired to decrease the melting time of 300 ms at 800% of 300 VDC. The use of an alternate substrate material with a lower thermal conductivity, such as Steatite, decreases the amount of time required to reach the 800 Amps value. As opposed to a melting time of 160 ms using 0.6 mm thick Alumina for the substrate 615, a decreased melting time of 16 ms may be achieved using 0.6 mm thick Steatite or of 3.3 ms using 0.7 mm thick Forsterite.

Additionally, Steatite and Forsterite have thermal expansion coefficients at room temperature that are closer to the thermal expansion coefficients at room temperature for the metal used for printing the fusible element 605. A decreased difference in thermal expansion coefficients between the substrate 615 and the printed fusible element 605 is desired to prolong the life of the substrate 615 to avoid metal fatigue.

Figure 7:
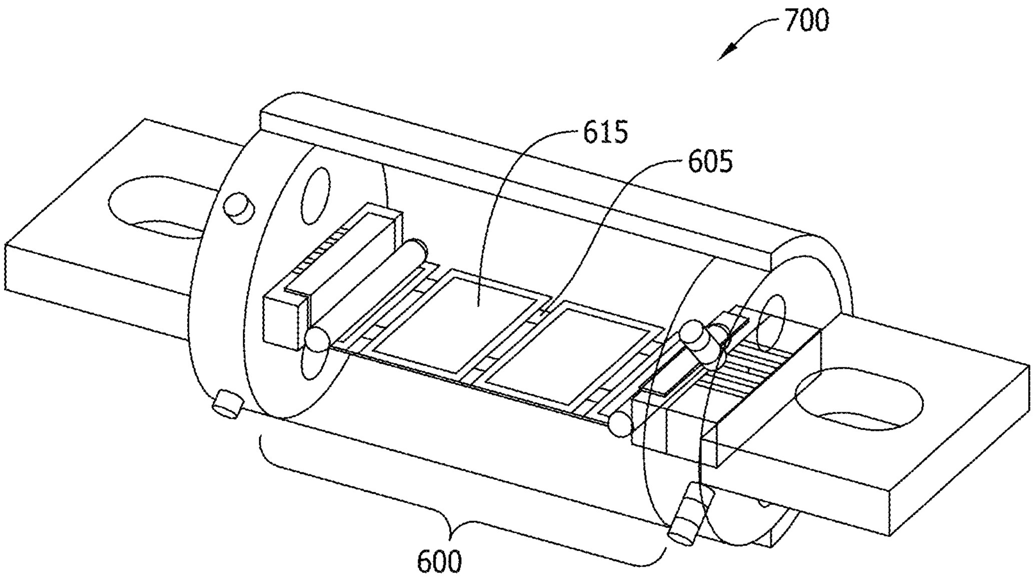
FIG. 7 is an alternative embodiment of a power fuse including the fuse element assembly shown in FIG. 6.

FIG. 7 illustrates an alternative embodiment of a power fuse 700 including fuse element assembly 600. Fuse element 600 includes a conductor having coplanar connector sections mounted on the weak spots and obliquely extending sections extending above the substrate such that an arc extinguishing filler can be disposed to surround at least part of the fuse element assembly, thereby effectively extinguishing an arc generated after the fuse element assembly opens at predetermined current conditions. The arc extinguishing filler may include quartz sand.

The alternative embodiment shown in FIG. 7 is optional and is not limited by the components shown. For example, power fuse 700 may include an alternate housing, an alternate structure, and/or more than one fuse element.

Figure 8:
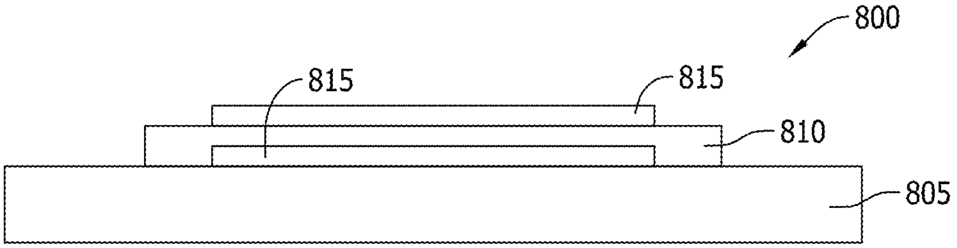
FIG. 8 is a schematic diagram of a second dielectric layer over the weak spots.

FIG. 8 illustrates a second dielectric layer over weak spots 810, as part of an alternative fuse element assembly 800. Dielectric layers 815 include a first dielectric layer over substrate 805 and a second dielectric layer over weak spot 810. Dielectric layers 815 may affect heat transfer to the substrate in the operation of the weak spot and may affect the breakdown point of the substrate and therefore be a consideration from an arcing management perspective. The alternative fuse element assembly 800 may be used in power fuse 700, in lieu of fuse element assembly 600.

The benefits and advantages of the present disclosure are now believed to have been amply illustrated in relation to the exemplary embodiments disclosed.

Various embodiments of power fuses and fuse element assemblies and their fabrication methods are described herein including a plurality of weak spots formed on a substrate without stamped weak spot openings, thereby avoiding thermal-mechanical fatigue strain in the fuse element assembly when subjected to transient load current cycling events. Further, the fuse assembly includes a conductor having coplanar connector sections mounted on the weak spots and obliquely extending sections extending above the substrate such that an arc extinguishing filler can be disposed to surround at least part of the fuse element assembly, thereby effectively extinguishing an arc generated after the fuse element assembly opens at predetermined current conditions.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from those described and depicted without departing from inventive concepts described. Also, in certain embodiments, certain components in the assemblies described may be omitted to accommodate particular types of fuses or the needs of particular installations, while still providing the needed performance and functionality of the fuses.

An embodiment of a printed fuse has been disclosed. The printed fuse includes a substrate and a fusible element printed on the substrate. The fusible element printed on the substrate includes a series of portions of reduced printed thickness, defining weak spots for fusible operation of the fusible element, respectively separated by portions of increased printed thickness.

Optionally, the printed fuse further includes defined weak spots of a thickness of about 10 microns, extending in a width dimension substantially less than the width dimension of the substrate and a length dimension equal to the length dimension of the substrate. The defined weak spot width dimension may be about 5 mm or less and the length dimension may be about 1 mm. An arc extinguishing filler may extend between the defined weak spots. The defined weak spots open with a melting time of about 20 ms or less for a current that is 800% of the rated current for the printed fuse. The defined weak spots may open with a melting time of about 10 ms or less for a current that is 800% of the rated current for the printed fuse.

Optionally, the printed fuse further includes a substrate of a low thermal conductivity material of a thickness of about 1.2 mm, with a thermal conductivity substantially less than 24 W/m/K. The substrate thermal conductivity may be about 5 W/m/K or less. The printed fuse further includes a first dielectric layer underlying only the weak spots and a second dielectric layer overlying only the weak spots. The first and second dielectric layers are glass of a thickness of about 12 microns.

Optionally, the printed fuse further includes a fusible element of silver and a substrate of Steatite or Forsterite. The printed fuse has a voltage rating of at least 300V and an amperage rating of 400 A.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A printed fuse fabrication comprising:

a substrate;

a fusible element coupled to a top portion of the substrate in successive layers of conductive material, the fusible element including a series of portions of reduced thickness respectively separated by portions of increased thickness, the portions of reduced thickness defining weak spots for fusible operation of the fusible element, wherein the portions of reduced thickness correspond to a number of layers of the fusible element on top of the substrate that is less than a number of layers of the fusible element on top of the substrate corresponding to the portions of increased thickness; and a dielectric layer coupled to the substrate beneath the fusible element, the dielectric layer underlying only the portions of reduced thickness defining the weak spots of the fusible element.

2. The printed fuse fabrication of claim 1, wherein the fusible element comprises silver.

3. The printed fuse fabrication of claim 1, wherein the weak spots have a thickness of about 10 microns.

4. The printed fuse fabrication of claim 1, wherein the substrate has a thickness of about 1.2 mm.

5. The printed fuse fabrication of claim 1, wherein the dielectric layer is glass.

6. The printed fuse fabrication of claim 1, wherein the dielectric layer has a thickness of about 12 microns.

7. The printed fuse fabrication of claim 1, wherein the substrate is a low thermal conductivity substrate.

8. The printed fuse fabrication of claim 7, wherein the low thermal conductivity substrate has a thermal conductivity substantially less than 24 W/m/K.

9. The printed fuse fabrication of claim 8, wherein the low thermal conductivity substrate has a thermal conductivity of about 5 W/m/K or less.

10. The printed fuse fabrication of claim 1, wherein the substrate is Steatite.

11. The printed fuse fabrication of claim 1, wherein the substrate is Forsterite.

12. The printed fuse fabrication of claim 1, wherein the substrate has a length dimension and a width dimension, and wherein the weak spots extend with a width dimension substantially less than the width dimension of the substrate.

13. The printed fuse fabrication of claim 12, wherein each of the weak spots extend in the width dimension as a separated plurality of segments each being about 5 mm or less in the width dimension.

14. The printed fuse fabrication of claim 13, wherein the separated plurality of segments extend in the length dimension for about 1 mm.

15. The printed fuse fabrication of claim 14, wherein an arc extinguishing filler material extends between the separated plurality of segments.

16. The printed fuse fabrication of claim 1, wherein the weak spots open with a melting time of about 20 ms or less for a current that is 800% of a rated current for the fuse.

17. The printed fuse fabrication of claim 16, wherein the weak spots open with a melting time of about 10 ms or less for a current that is 80% of the rated current for the fuse.

18. The printed fuse fabrication of claim 17, wherein the fuse has a voltage rating of at least 300V, and wherein the fuse has an amperage rating of 400 A.

19. A printed fuse fabrication comprising:

a substrate;

a fusible element coupled to a top portion of the substrate, the fusible element including a series of portions of reduced thickness respectively separated by portions of increased thickness, the portions of reduced thickness defining weak spots for fusible operation of the fusible element, wherein the fusible element comprises a base layer coupled to the top portion of the substrate and a plurality of intermediate layers coupled to sections on top of the base layer, wherein the portions of reduced thickness correspond to the base layer and the portions of increased thickness correspond to the plurality of intermediate layers coupled to the sections on top of the base layer; and a dielectric layer coupled to the substrate beneath the fusible element, the dielectric layer underlying only the portions of reduced thickness defining the weak spots of the fusible element.

20. A printed fuse fabrication of claim 1, wherein the portions of reduced thickness defining the weak spots comprises one or more second dielectric layers.

* * * * *